United States Patent [19]

Wolfberg et al.

[11] Patent Number: 5,745,706
[45] Date of Patent: Apr. 28, 1998

[54] COMPUTER SYSTEM AND RELATED EQUIPMENT FOR SPENDING AND INVESTMENT ACCOUNT MANAGEMENT

[76] Inventors: Larry Wolfberg, 10702 Levico Dr., Los Angeles, Calif. 90077; Brent Wolfberg, 575 S. Barrington Ave., Suite 206, Los Angeles, Calif. 90049

[21] Appl. No.: 367,505

[22] Filed: Dec. 30, 1994

[51] Int. Cl.⁶ .................................................. G06F 17/60
[52] U.S. Cl. ......................................... 395/235; 395/240
[58] Field of Search ............................... 364/401 R, 406, 364/408; 395/201, 235, 236, 238, 239, 240, 241, 242

[56] References Cited

U.S. PATENT DOCUMENTS

| | | | |
|---|---|---|---|
| 4,346,442 | 8/1982 | Musmanno | 364/408 |
| 4,750,119 | 6/1988 | Cohen et al. | 364/401 |
| 4,885,685 | 12/1989 | Wolfberg et al. | 364/401 |
| 4,972,463 | 11/1990 | Danielson et al. | 364/408 |
| 4,994,964 | 2/1991 | Wolfberg et al. | 364/408 |
| 5,036,461 | 7/1991 | Elliott et al. | 364/408 |
| 5,210,678 | 5/1993 | Wolfberg et al. | 364/408 |
| 5,214,579 | 5/1993 | Wolfberg et al. | 364/408 |

OTHER PUBLICATIONS

Dialog Software Abstract: File 237, Acc#00015505; Moneycounts; version 7.0; Parsons Technologies, Inc.; Date Released: 1992; two pages.

BNA; "CDs: National Bank in New Mexico Makes Second Offering of New CD"; BNA Banking Daily; Oct. 20, 1994; 1st Article of Level 1.

BNA; "FDIC: FDIC Says Deposit Insurance Will Cover New Retirement CD, With a Key Limitation"; BNA Banking Daily; Jun. 1, 1994; 11th Article of Level 1.

BNA; "Legislation: Dingell Introduces Insurance Bill To Restrict Sales of Retirement CD"; BNA Banking Daily; Sep. 26, 1994; 5th Article of Level 1.

BNA; "Legislation: Senate Banking Members Seek Law to Prohibit Sales of Retirement CD"; BNA Banking Daily; Jun. 23, 1994; 10th Article of Level 1.

BNA; "Regulation: Comptroller Approves Retirement CD Qualifying for Annuity Tax Treatment"; BNA Banking Daily; May 16, 1994; 12th Article of Level 1.

BNA; "Retirement CD: Action on Retirement CD Delayed Until Next Year, But Concerns Remain"; BNA Banking Daily; Oct. 13, 1994; 2nd Article of Level 1.

(List continued on next page.)

*Primary Examiner*—James P. Trammell
*Attorney, Agent, or Firm*—D'Alessandro & Ritchie

[57] ABSTRACT

A method, computer system and equipment for managing an investment and spending account, so as to achieve selected guidelines for spending flexibility and investment returns. A computer system, for recording account information and a processor for processing account data and transactions associated with the account, implements a combined spending and investment account, by which an account holder achieves a selected degree of spending flexibility and a selected investment return. The computer system monitors inflows to and outflows from the account, and investment returns achieved for the account, and indicates when adjustments to the account are required to achieve the selected investment guidelines while presenting the account holder with the selected spending flexibility. The computer system associates a spending account with a related investment account, so that the account holder may access the spending account within the spending flexibility guidelines, while an account manager, either a human being or a computer program such as an artificial intelligence, controls the associated investment account within the investment guidelines. The computer system tracks and monitors the resources available in the spending account and the investment account, and responsive thereto, presents the account manager with signals indicating whether investment adjustments are suggested for meeting the investment guidelines and while still permitting outflows within the spending account according to the spending flexibility guidelines.

76 Claims, 2 Drawing Sheets

OTHER PUBLICATIONS

BNA; "Retirement CD: Ludwig Reaffirms OCC's Position on Retirement CD in Letter to Dingell"; BNA Banking Daily; Jul. 15, 1994; 7th Article of Level 1.

BNA; "Retirement CD: Sen. Dodd Introduces Bill to Kill New Retirement CD; Seeks Retirement CD; Seeks Senate Passage" BNA Banking Daily; Oct. 7, 1994; 3rd Article of Level 1.

Faulkner & Gray's "Card Fax$_{TM}$"; Interim Bulletin Service, Feb. 10, 1995, p. 1.

Mellon Bank; "Corner Stone, The Interest–Back Card, Gold MasterCard" Cardmember Handbook *Best available copy. Unknown date.

Novack, Janet; "A piece of the action"; Starting Your Own Business; *Forbes;* Aug. 1, 1994; p. 90.

Letter dated Nov. 1, 1993, from NationsBank with enclosures (10 pages).

Letter (undated) from Mellon Bank with enclosures (6 pages).

5,745,706

COMPUTER SYSTEM AND RELATED EQUIPMENT FOR SPENDING AND INVESTMENT ACCOUNT MANAGEMENT

BACKGROUND OF THE INVENTION

1. Field of the Invention

This invention relates to a computer system and related equipment for spending and investment account management.

2. Description of Related Art

Banking and investment companies, as well as others, generally employ computer systems for monitoring and tracking accounts, such as to record and retrieve information about the status of an account, and to generate reports about accounts.

While these methods of generating reports about accounts generally achieve the purpose of informing banks, investment companies, and others, about the status of accounts, they have the drawback that they do not inform persons related to the account (such as the account's owners or managers) with actions that should be taken to maintain the account in a predetermined selected status. For example, with an ordinary checking account, the standard methods of generating reports generally only inform the account owner when the account is overdrawn, rather than informing the account owner when the overdrawn condition is imminent.

One known method, as shown in U.S. Pat. No. 4,885,685, U.S. Pat. No. 5,210,687, and U.S. Pat. No. 5,214,579, is to track and monitor an account to determine if that account is meeting a set of selected account guidelines, and to generate a signal if the account is not meeting those guidelines. For example, if an investment account is targeted to grow at a 6% average annual rate of return, and is below that growth rate, a tracking and monitoring system would generate a signal to indicate that failure to meet the selected account guidelines.

It would be advantageous to provide a method, system, and related equipment, whereby a combined investment and spending account can be monitored or tracked, so that an account holder or an account manager (either a human being or a computer program such as an artificial intelligence program) may be apprised of an action which is desirable to achieve selected spending flexibility guidelines or investment guidelines.

It would also be advantageous to provide a method, system, and related equipment, whereby an account holder may designate spending from a spending or investment account using a distributed banking technique, may designate spending from a spending or investment account at a remote point in place of bills or coins, or to maintain information about a spending or investment account in a distributing banking manner.

SUMMARY OF THE INVENTION

The invention provides a method and computer system and related equipment for managing a spending and investment account, having a mechanism to achieve selected guidelines for spending flexibility and investment returns. A computer system, having a memory for recording account information and a processor for processing account data and transactions associated with the account, implements a combined spending and investment account, by which an account holder achieves a selected degree of spending flexibility and a selected investment return. The computer system monitors inflows to and outflows from the account, and investment returns achieved for the account, and indicates when adjustments to the account are required to achieve the selected investment guidelines while presenting the account holder with the selected spending flexibility.

In a preferred embodiment, the computer system and related equipment associates a spending account with a related investment account (for example, the related investment account may comprise: an annuity personalized to the account holder, a share in an investment mutual fund, or an obligation by an investment entity such as an insurance company), so that the account holder may access the spending account within the spending flexibility guidelines, while an account manager (either a human being or a computer program such as an artificial intelligence program) controls the associated investment account within the investment guidelines. The computer system and related equipment monitor the resources available in the spending account and the investment account, and responsive thereto, present the account manager with signals indicating whether investment adjustments are suggested for meeting the investment guidelines and while still permitting the spending flexibility guidelines, and/or present the account holder with signals indicating whether monetary inflows are needed or outflows are permitted within the spending flexibility guidelines and while still meeting the investment guidelines. The computer system and related equipment may also periodically interrogate the account holder to determine if the spending flexibility guidelines or investment guidelines should be changed to adapt to new or altered circumstances for the account holder.

In a preferred embodiment, the spending flexibility guidelines are selected from a group comprising known cash loan buffers, known interest rates, known payment rates, known percent of account size loan buffers, and combinations thereof. The investment guidelines are selected from a group comprising known cash returns, known maturity dates, known percent returns, and combinations thereof.

While the account is active, the account holder may make deposits to and withdrawals from the account, just like another type of account, such as: a checking or savings account, a credit card or debit card account, or any other type of account. Periodically (for example, each day, each week, or each month), the computer system examines the transactions associated with the account and determines if the status of the account permits the investment guidelines to be met. For example, if the account holder has drawn down the account balance, it may occur that the investment guidelines cannot reasonably be met without a monetary inflow. In this case, the computer system and related equipment may indicate to the account holder that additional monetary inflow is required (i.e., additional to an initial deposit for opening the account), such as by appending a charge to an statement for the account for that time period, by transferring funds from other accounts designated by the account holder for such purpose, by creation of a credit line or similar extension of credit, or in another manner agreed upon by the account holder with the account manager or another institution related to the account. Similarly, if the account holder has increased the account balance, the computer system may indicate to the account holder that additional funds are available for spending, such as by increasing a spending limit or credit limit in the spending flexibility guidelines, by transferring funds to other accounts designated by the account holder for such purpose, by expansion or other alteration of a credit line, or in another manner agreed upon by the account holder with the account manager or another institution related to the account. The computer system and related equipment are thus able to maintain the account simultaneously within the spending flexibility guidelines and the investment guidelines.

The invention also provides a method and computer system and related equipment for distributed access to financial accounts (such as checking accounts or other spending or investment accounts). A computer system, having a memory for recording account information and a processor for processing account data and transactions associated with the account, provides remote access to status information about the account, such as an account balance or progress information about spending flexibility guidelines or investment return guidelines. The remote access may be made using a credit card, debit card, a "smart card" having memory and possibly processing power, or another type of remote access, such as telephone access using a home computer. In a preferred embodiment, distributed access to the account may comprise financial transactions with vending devices using signals to indicate the deposit of bills or coins therewith.

DESCRIPTION OF THE PREFERRED EMBODIMENT

Inventions disclosed herein may be used in conjunction with one or more inventions shown in one or more of the following U.S. Patents:

U.S. Pat No. 4,885,685, "Investment Management System with Travel Usage Funds Indexed to Customer Account Status", issued Dec. 5, 1989 in the name of inventors Larry Wolfberg, Brent A. Wolfberg, and Jan E. Rhoads;

U.S. Pat. No. 5,210,687, "Business Transaction and Investment Growth Monitoring Data Processing System", issued May 11, 1993 in the name of inventors Larry Wolfberg, Brent A. Wolfberg, and Jan E. Rhoads; and U.S. Pat. No. 5,214,579, "Goal-Oriented Investment Indexing, Tracking and Monitoring Data Processing System", issued May 25, 1993 in the name of inventors Larry Wolfberg, Brent A. Wolfberg, and Jan E. Rhoads.

These patents are each hereby incorporated by reference as if fully set forth herein.

In the following description, a preferred embodiment of the invention is described with regard to preferred process steps and data structures. However, those skilled in the art would recognize, after perusal of this application, that embodiments of the invention may be implemented using a set of general purpose computers operating under program control, and related equipment controlled by such general purpose computers, and that modification of a set of general purpose computers and related equipment to implement the process steps and data structures described herein would be within their capabilities after perusal of this application.

THE COMPUTER SYSTEM

Figure 1:
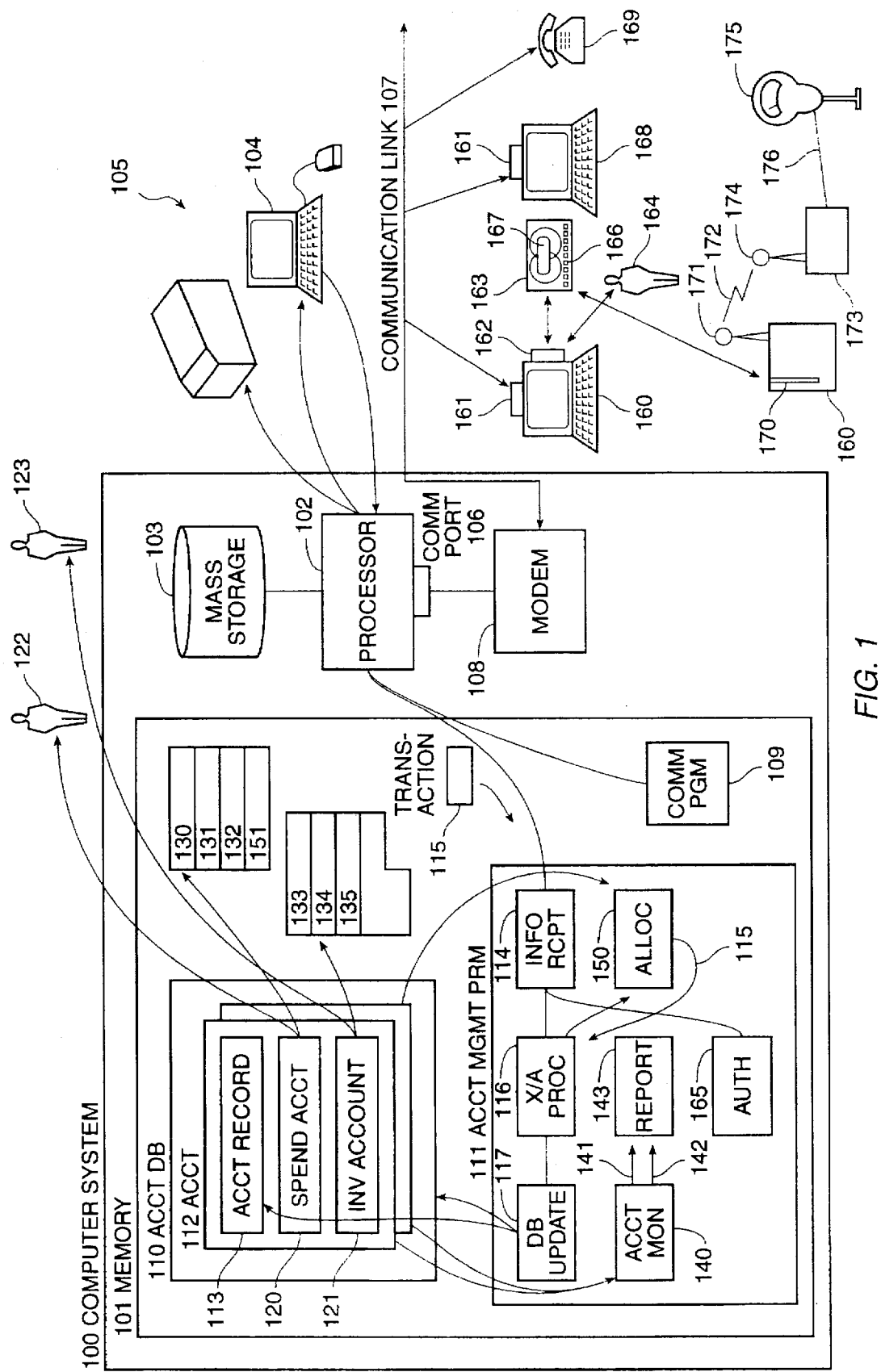
FIG. 1 shows a block diagram of a computer system and related equipment for management of a spending and investment account.

FIG. 1 shows a block diagram of a computer system and related equipment for management of a spending and investment account.

A computer system 100 comprises a memory 101 and a processor 102 operating according to instructions stored in the memory 101 and upon data stored in the memory 101. The memory is augmented by a mass storage device 103 coupled to the processor 102, such as a magnetic disk drive with a magnetic disk or a magnetic tape drive with at least one magnetic tape. The processor 102 is also coupled to at least one input device 104, such as a keyboard or touchscreen, a mouse or other pointing device, and to at least one output device 105, such as a monitor or printer.

In a preferred embodiment, the input devices 104 comprise at least one communication port 106 coupled to a communication link 107, such as using a modem 108 or related communication equipment, for receiving and transmitting information and instructions regarding an account controlled by the computer system 100. The communication port 106 is coupled to a communication program 109 stored in the memory 101 for receiving and interpreting such information and instructions, and for transmitting such information and instructions using said communication link 107.

The computer system 100 comprises an account database 110, and an account management program 111, both stored in the memory 101. The account database 110 comprises at least one account 112 having an account record 113, for recording information about the account 112. The account management program 111 comprises an information receipt program 114 for receiving transactions and other information 115 associated with the account 112, a transaction processing program 116 for processing those transactions and other information 115, and a database update program 117 for altering the account database 110 and the account record 113 in conjunction with processing those transactions 115 and other information.

In a preferred embodiment, the computer system 100, account database 110, account management program 111, information receipt program 114, transaction processing program 116, and database update program 117, comprise a computer system and programs like those shown in U.S. Pat. Nos. 4,885,685; 5,210,687; or 5,214,579, hereby incorporated by reference as if fully set forth herein.

Nature of Accounts

The account database 110 comprises at least a first type of account, a spending account 120, and a second type of account, an investment account 121. The spending account 120 is affected by and records the result of transactions 115 related to spending by an account holder 122, such as invoices, rebates or returns associated with those invoices, and payments associated with those invoices. The investment account 121 is associated with the spending account 120, and is affected by and records the result of transactions 115 related to the investments by an account manager 123, such as purchases and sales of investment assets, dividends, interest, stock splits and stock dividends.

As used herein, the phrase "spending" refers generally to any manner of spending for consumption, such as the purchase, lease, or rental of goods, services, or combinations thereof. Examples herein are primarily directed to consumer spending, such as for food, clothing, housing or other shelter, automobiles or other transportation, entertainment and gifts, or education. However, the spending account 120 may be directed to a business spending account (or to a hybrid spending account or a spending account having no concrete business or consumer orientation), such as a revolving credit line, payroll, capital equipment or other depreciable goods, intangible assets or other amortizable assets, and other monetary flows considered to be of a spending nature.

Transactions 115 associated with the spending account 120 may relate to cash withdrawals for spending, automated transfers, checks, credit cards, debit cards, electronic funds transfers, invoices, statements of account, vouchers or other credit or debit memos, wire transfers, or other transactions for spending. Transactions 115 associated with the spending account 120 may also relate to cash deposits or other deposits, automated transfers, electronic funds transfers, vouchers or other credit or debit memos, wire transfers, or other transactions for payment for spending.

In a preferred embodiment, the spending account 120 comprises a combined checking and revolving credit account, having the features of both a checking account and of a revolving credit account. The spending account 120 is disposed for having either a positive balance, for which the account manager 123 may pay interest or another positive incentive, or a negative balance, against which the account manager 123 may charge interest, a service charge, or another negative incentive.

Preferably, the account manager 123 pays interest for a positive balance at a rate responsive to federal T-Bill rate, and charges interest for a negative balance at a rate responsive to the "prime rate" for banking, plus a small service charge associated with maintaining the account.

A preferred spending account 120 is affected by and reflect the results of either a first or second suite of spending transactions:

A first suite of spending transactions comprises checking transactions by the account holder 122.

A second suite of spending transactions comprises credit card transactions by the account holder 122, and checking transactions to provide monetary inflows to the either the spending account 120 or the investment account 121.

As used herein, the phrase "investment assets" refers generally to any manner of ownership or other interest for the purpose or effect of investment, such as stocks, bonds, mutual funds, money market funds, annuities, insurance contracts, futures, options, physical commodities, precious metals, foreign currencies, rare coins, and other investment vehicles such as derivatives thereof, whether relatively "active" investments such as stocks or bonds, or relatively "passive" investments such as a money market fund. The investment assets associated with the investment account 121 may be personal to the account holder 122, may be an undivided interest in a pool such as a mutual fund, or may comprise an obligation of an investment entity such as an insurance company or of another party such as the account holder 123 itself.

In a preferred embodiment, the investment account 121 comprises an obligation by an insurance company contracted for by the account manager 123, such as an obligation to pay a fixed sum as of a date certain in the future, and where the fixed sum is responsive to an opening balance in the spending account 120. Preferably, the obligation is to pay a 50% rebate of the opening balance of the spending account 120 after a twenty year period.

By controlling the amount spent for products and services, the account holder 122 has a built in discipline program for funds being spent with a selected set of spending flexibility guidelines and corresponding actions to cover the account holder's individual circumstances. The result is predictable growth of equity according to the investment guidelines, responsive to the amount spent from the spending account 120.

In alternative embodiments, the investment account 121 may comprise investment assets held by an escrow agent or trust, instructed to deliver a fixed sum as of a date certain in the future, and where the fixed sum is responsive to an opening balance in the spending account 120. Preferably, the fixed sum and the date certain comprise a 50% rebate of the opening balance of the spending account 120 after a twenty year period.

The rebate percentages and time periods shown herein are exemplary; rebate percentages and time periods having different values would be alternative embodiments, and are within the scope and spirit of the invention, as would be alternative accounts combining other business, insurance, or financial services.

In alternative embodiments, the fixed sum and the date certain may comprise alternative values, chosen by the account holder 122 from a set of alternatives offered by the account manager 123 or another institution. For example, a banking institution may offer the account holder 122 a set of alternative values having differing fixed sums or dates certain, each having the feature that the account holder 122 achieves a spending flexibility service or an investment gain over other financial products, while the account manager 123 or the banking institution is compensated for its financial product offering.

In alternative embodiments, the account holder 122 may also borrow against equity in the investment account 121 to expand the spending flexibility guidelines 131, as provided for by the account manager 123 or the institution providing the account 112, and consistent with the investment guidelines 134. The account holder 122 may borrow from a financial institution maintaining the account 112, or from others, either by direct pledge of the account, by means of a negative pledge, or a related promise. For one example, when the spending flexibility guidelines 131 are reached, the account management program 111 examines the investment account 121 to determine if equity is available to expand the spending flexibility guidelines 131, consistent with the investment guidelines 134, and if so, expands the spending flexibility guidelines 131 commensurately.

The account holder 122 may comprise an individual, a family, or an organization (whether incorporated or not) responsible for spending associated with the spending account 120, and who may be to be obligated for such spending.

The account manager 123 may comprise an individual or an organization (whether incorporated or not) responsible for managing the assets associated with the investment account 121, and may or may not comprise the same persons or organizations as the account holder 122. Alternatively, the account manager 123 may comprise a computer program, such as an artificial intelligence program, disposed to monitor and adjust the disposition of the assets associated with the investment account 121, pursuant to a selected plan with flexibility to change to adapt to new or altered circumstances of the account holder 122.

Account Usage

The spending account 120 comprises a spending account balance 130, a set of spending flexibility guidelines 131 (such as a credit limit, a timed spending limit, a minimum repayment schedule, or other guidelines), and a set of spending actions 132 to be suggested or triggered responsive to the spending flexibility guidelines 131 as applied to a status of the spending account 120. In a preferred embodiment, the spending flexibility guidelines 131 comprise thresholds which must remain unexceeded to meet the guidelines. In a preferred embodiment, the spending flexibility guidelines 131 are 27 known from the group comprising known cash loan buffers, known interest rates, known payment rates, known percent of account size loan buffers, and combinations and derivatives thereof.

The investment account 121 comprises an investment account balance 133, a set of investment guidelines 134 (such as a minimum annual return, a maximum variance of annual return, a minimum or maximum exposure to equity investments, an expected maturity date, or other guidelines), and a set of investment actions 135 to be suggested or triggered responsive to the investment guidelines 134 as applied to a status of the investment account 121. In a preferred embodiment, the investment guidelines 134 comprise thresholds which must remain unexceeded to meet the guidelines. In a preferred embodiment, the investment guidelines 134 are selected from a group comprising known cash returns, known maturity dates, known percent returns, and combinations an derivatives thereof.

In a preferred embodiment, the investment account's guidelines 134 comprise a minimum annual return of 6.03% and an expected maturity date of twenty years from opening the account, to provide at that time a 50% rebate of the opening spending account balance 130.

In an alternative preferred embodiment, the investment account's guidelines 134 comprise a minimum annual return of 9.52% and an expected maturity date of twenty years from opening the account, to provide at that time a 100% rebate of the opening spending account balance 130.

For example, the account holder 122 making an initial deposit of $10,000 may select an account 112 comprising a spending account 120 having the following spending flexibility guidelines 131: an opening spending account balance 130 of $8,500, an overdraft buffer of 25% of the opening spending account balance 130, an payment interest rate in the range of about 1 to 3% over the prime rate, and rolling credit payments within 30 days of any negative spending account balance 130, and associated with an investment account 121 having the following investment guidelines 134: an opening investment account balance 133 of $1,500, a known percent rebate of 50% of the opening spending account balance 130, and a known maturity date of twenty years from an account opening date.

In this example, the account holder 122 would use the spending account 120 for spending the amount allocated to the spending account 120, such as by paying with cash, checks, credit cards or debit cards, or other means, for goods or services, or by similarly paying invoices issued by providers of goods or services. Such spending would decrement the spending account balance 130, and would be compared against the spending flexibility guidelines 131. Simultaneously, the account manager 123 would use the investment account 121 for investment the amount allocated to the investment account 121, such as by investing those assets in stocks, bonds, obligations of a bank or insurance company, or other types of investment. Such investments would be compared against the investment guidelines 134.

So long as the account holder 122 stayed within the spending flexibility guidelines 131, the investment account balance 133 would grow pursuant to the investment account guidelines 134, allowing the account holder to achieve the investment goals selected at account opening (such as the selected return at the selected time). If the account holder 122 varied from the spending flexibility guidelines 131, additional monetary inflows would be required to simultaneously meet the spending flexibility guidelines 131 and the investment guidelines 134, or the spending flexibility guidelines 131 and the investment guidelines 134 would have to be modified accordingly.

A financial institution maintaining the account, such as a bank, credit union, insurance company, stockbrokerage, or other institution, or its appointed manager, may administer the account 112 by providing the account holder 122 with benefits or services related thereto. These benefits or services may all be covered by a contractual commitment from the financial institution, whereby equity in the account 112, or related accounts, is used as collateral for the institution's commitment to the account holder 122.

Account Monitoring

The account management program 111 further comprises a monitoring program 140 coupled to the account database 110 and to the transaction processing program 116, so as to review incoming transactions 115 and to monitor the effect of those transactions 115 on each account 112. The account management program 111 reviews the status of each account 112 and determines periodically, such as once per month, whether the status of that account 112 is within the spending flexibility guidelines set for the spending account 120 and is within the investment guidelines set of the investment account 121.

Responsive to the status of the account 112, the monitoring program 140 generates a set of spending flexibility signals 141, indicating whether monetary inflows are suggested or outflows are permitted within the spending flexibility guidelines 131 and while still meeting the investment guidelines 134. Similarly, responsive to the status of the account 112, the monitoring program 140 generates a set of investment signals 142, indicating whether investment adjustments are suggested for meeting the investment guidelines 134 and while still permitting the spending flexibility guidelines 131 to remain unchanged.

In a preferred embodiment, the monitoring program 140 20 generates the spending flexibility signals 141 and the investment signals 142 periodically, such as each month at the time of a periodic statement. However, in alternative embodiments, the monitoring program 140 may generate the spending flexibility signals 141 and the investment signals 142 more often or less often, such as each day or each quarter, or may be responsive to selected transactions 115 (such as large transactions 115 exceeding a selected threshold such as $2,500) to generate either spending flexibility signals 141 or the investment signals 142 asynchronously.

The account management program 111 further comprises a reporting program 143 coupled to the spending flexibility signals 141 and the investment signals 142, so as to report to the account holder 122 whether monetary inflows are suggested or outflows are permitted within the spending flexibility guidelines 131 and while still meeting the investment guidelines 134, and to report to the account manager 123 whether investment adjustments are suggested for meeting the investment guidelines 134 and while still permitting the spending flexibility guidelines 131 to remain unchanged. In a preferred embodiment, reports by the reporting program 143 may be combined with a statement for the account 112 to the account holder 122 or the account manager 123.

In a preferred embodiment, reports by the reporting program 143 are used by the account management program 111 to generate an surcharge to the spending account 130 when monetary inflows are suggested, and to generate an increase in credit limit or other adjustment to the spending flexibility guidelines 131 when additional outflows are permitted while still meeting the investment guidelines 134. If the account holder 122 has drawn down the spending account balance 130 so far that the investment guidelines 134 cannot reasonably be met without a monetary inflow, the account management program 111 generates a surcharge to the account holder 122 sufficiently large so that when paid, the account 112 is then simultaneously within the spending flexibility guidelines 131 and the investment guidelines 134.

Similarly, if the account holder 122 has increased the spending account balance 130 or the investment account balance 131 so far that the spending flexibility guidelines 131 may be relaxed while still meeting the investment guidelines 134, the account management program 111 alters the spending flexibility guidelines 131 by increasing a spending limit or credit limit.

In alternative embodiments, the account management program 111 may generate a report to the account manager 123, instructing it to alter a stock/bond ratio or otherwise change an investment plan associated with the investment account 121, so as to meet the investment guidelines 134 without altering the spending flexibility guidelines 131. For example, if the investment guidelines 134 provide for a specified return at a specified date, and the account management program 111 determines that greater annual return on investment is required to meet those investment guidelines 134, the account management program 111 may generate a report to the account manager 123, instructing it to alter the proportion of assets invested in stocks (rather than in bonds), so as to increase an expected annual return on investment and thus meet the investment guidelines 134 (the account holder 122 having chosen a selected set of benefits or services for the account holder's own circumstances, such as from a menu of benefits or services presented by the account manager 123 or a financial institution maintaining the account 112).

However, if the account holder 122 continues to draw down the spending account balance 130, the spending flexibility guidelines 131 generally must be altered at some point, as changes in the allocation of investment assets in the investment account 121 cannot always make up for arbitrarily large spending.

Extended Types of Account

In a preferred embodiment, the account management program 111 comprises an allocation program 150, coupled to the account database 110 and to the transaction processing program 116, so as to review incoming transactions 115 and to generate transactions 115 to allocate monetary inflows to the spending account 120 and to the investment account 121. Preferably, of each $1 of monetary inflow, 85 cents are allocated to the spending account 120 and 15 cents are allocated to the investment account 121; however, these amounts may be varied responsive to the spending flexibility guidelines and investment guidelines chosen by the account holder 122 or otherwise assigned to the account 112, and may even be varied dynamically responsive to the status of the account 112.

All these amounts shown are of course exemplary and may be varied to offer a variety of financial products for the prospective account holder 122. Implementation of a method, computer system, or related equipment using different amounts would be within the scope and spirit of the invention.

In alternative embodiments, the allocation program 150 may be disposed to allocate monetary inflows, the spending account balance 130, or the investment account balance 133, to automatic adjustment. For example, the allocation program 150 may be disposed to move amounts into or out of the spending account 120, into or out of the investment account 121, or to make payments at selected intervals to predetermined payees.

In alternative embodiments, the allocation program 150 may be disposed to make periodic payments on a home mortgage, on an automobile loan or other loan, or for an insurance policy, investment plan, or savings plan. For example, the allocation program 150 may be disposed to periodically invest a fixed amount in a predetermined investment asset, using the investment account 121.

In alternative embodiments, the allocation program 150 may be disposed to make periodic purchases or related payments, such as periodic purchases of life insurance, home mortgage insurance, homeowner insurance, automobile insurance, or other insurance; periodic payments of property taxes or other taxes or government fees; periodic payments for utilities, telephone services, or other services; periodic purchases of supplies or other goods or services; or periodic payments or purchases of other kinds.

In alternative embodiments using an interactive connection as described with regard to distributed banking herein, the allocation program 150 may be disposed to present such periodic purchases or payments to the account holder 122 for approval or for information.

In alternative embodiments, the allocation program 150 may be disposed to reallocate investment returns from the investment account 121, such as from a profit sharing plan or pension plan, either to the same investment asset or to a predetermined investment asset.

In alternative embodiments, the allocation program 150 may be disposed to credit the account holder 122 with non-cash credits associated with the spending account 120, such as "frequent flier" miles good toward the purchase of airline tickets, or the equivalent credits associated with hotel services, automobile rental services, or other products or services. In such an alternative embodiment, the spending account 120 comprises an non-cash entry 151 for transmission or reporting to a sponsor of a "frequent flier" or related program, such as an airline, hotel, automobile rental company, or other supplier of products or services.

Distributed Banking

The computer system 100 is disposed to be coupled, using the communication link 107, to a remote terminal 160 using a remote modem 161. As used herein, the term "remote" refers to logical remoteness, and does not necessarily imply physical distance or another type of remoteness. The remote terminal 160 may comprise a point-of-sale terminal having a magnetic reader 162 or other coupling for an account card 163, and may be disposed for a purchaser 164 (possibly the account holder 122) to present the account card 163 for making a purchase.

The remote terminal 160 reads information about the account 112 from the account card 163 using the magnetic reader 162, such as an account number, and transmits that information (along with additional information about the purchase) to the computer system 100 using the communication link 107 using the remote modem 161. The computer system 100, using the modem 108 and the communication port 106, couples the information to an authorization program 165 in the memory 101 using the information receipt program 114. The authorization program 165 is disposed to validate the account card 163 and authorize the purchase, or to deny authorization for the purchase, responsive to the account record 113 in the account database 110.

In a preferred embodiment, the account card 163 comprises a "smart card", having a card memory 166, in which information about the account 112 is stored. This information comprises time-varying elements, such as the spending account balance 130 and the investment account balance 131, and time-invariant elements, such as the account number for the account 112. The account card 166 is disposed to display selected time-varying and time-invariant contents of the card memory 166 on a card display 167, so that the purchaser 164 may read it by reference to the account card 166.

In alternative embodiments, the account card 166 may comprise a credit card, a debit card, a check-guarantee card, or another type of purchasing card. In a first example, the account card 166 may comprise a debit card having a fixed, predetermined spending amount, similar to telephone calling debit cards. In a second example, the account card 166 may be restricted to selected classes of goods or services, to selected times for purchase, or in any other manner controlled by the computer system 100 or by the account card 166.

In alternative embodiments, the remote terminal 160 may comprise a personal computer 168 coupled to the communication link 107 using a modem 161, or a telephone 169 coupled to the communication link 107 using DTMF tones or voice recognition, and disposed in either case to present information about the account 112 (either visually on a monitor at the remote terminal 160, or by voice response at the personal computer 168 or the telephone 169), responsive to requests for that information by the account holder 122.

In alternative embodiments, the remote terminal 160 may collect information about the account 112, or about the purchaser 164, using one or more of a variety of techniques, such as: by reading a magnetic stripe, by accessing the card memory 166, by scanning a fingerprint or thumbprint of the purchaser 164, or by another technique. The remote terminal 160 may be coupled to the communication link 107 using one or more of a variety of techniques, such as: by direct connection, by telephone, by wireless connection, or by another technique.

In alternative embodiments, the remote terminal 160 may display information about the account 112 to the account holder 122 or to the vendor, such as: an account balance, the spending account balance 130 or progress information regarding the spending flexibility guidelines 131 where the account 112 comprises a spending account 120, the investment account balance 133 or progress information regarding the investment guidelines 134 where the account 112 comprises an investment account 121, or other information about the account 112.

In one alternative embodiment, the remote terminal 160 may be coupled to (or built into) a vending device or another electrical or mechanical device for providing goods or services. For example, the remote terminal 160 may be responsive to a selected signal, such as a radio signal, an infrared signal, an ultrasound signal, or another type of signal, for triggering a physical coupling in a mechanical device indicative of receiving payment in bills or coins. In this example, the remote terminal 160 is coupled to a parking meter, and is responsive to defined signals from the account card 166 representative of coin inputs to the parking meter. The parking meter or other vending device is responsive to the defined signals to provide selected goods or services, such as providing parking time responsive to a 25 cent signal representative of a 25 cent piece, a 10 cent signal representative of a 10 cent piece, a 5 cent signal representative of a 5 cent piece, or a $1 signal representative of a $1 bill. The account card 166 provides the 25 cent signal, the 10 cent signal, the 5 cent signal, or the $1 signal, responsive to a corresponding deduction from the spending account balance 130, and the remote terminal 160 provides a corresponding signal to the computer system 100 to make a corresponding transfer to another account related to the vending device.

In this alternative embodiment, the remote terminal 160 comprises a receptacle slot 170 disposed to receive and couple to the account card 166, a signal transmitter 171, such as for a radio, infrared, ultrasound, or another type of signal, disposed to transmit a signal 172 to an interface 173. The interface 173 comprises a signal receiver 174 and is coupled to a vending device 175 such as a parking meter, vending machine, or other vending device. The interface 173 is coupled to the vending device 175 either by an electronic connection or by a mechanical linkage 176 disposed to trigger a mechanical effect at the vending device 175, such as the mechanical effect of receiving a bill or coin.

METHOD OF USING THE SPENDING AND INVESTMENT ACCOUNT

Figure 2:
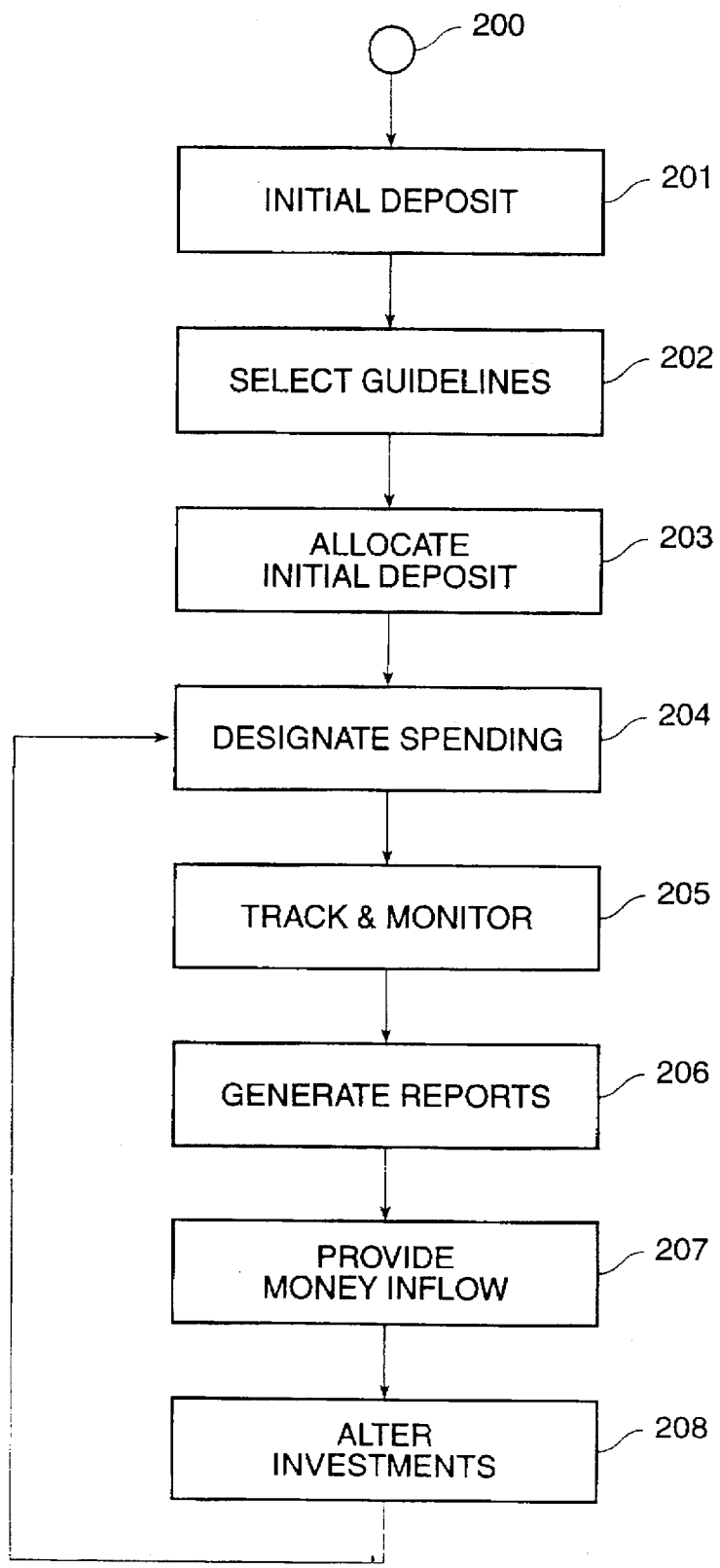
FIG. 2 shows a flow diagram of a technique for using a spending and investment account.

FIG. 2 shows a flow diagram of a technique for using a spending and investment account.

At a flow point 200, the account holder 122 is ready to create a new spending and investment account 112.

At a step 201, the account holder 122 provides an initial deposit for the account 112 to a spending and investment institution.

At a step 202, the account holder 122 selects spending flexibility guidelines 131 and investment guidelines 134 from a set of alternative spending flexibility guidelines 131 and investment guidelines 134 provided by the institution.

At a step 203, the account management program 111 allocates the initial deposit to the spending account balance 130 and the investment account balance 133, and initiates management of the investment account 121.

At a step 204, the account holder 122 designates spending from the spending account 120.

At a step 205, the account management program 111 tracks and monitors spending from the spending account 120 and investments for the investment account 121.

At a step 206, the account management program 111 generates one or more reports about the spending account 120 and the investment account 121.

At a step 207, the account holder 122 receives the reports and (optionally) provides monetary inflows to the account 112. The account management program 111 allocates these monetary inflows to the spending account 120 and to the investment account 121.

At a step 208, the account manager 123 receives the reports and (optionally) alters the allocation of the investment account 121 to investment assets.

At a step 209, the account management program 111 evaluates the monetary inflows to the account 112 from the step 207 and the allocation of the investment account 121 to investment assets from the step 208, and alters the spending flexibility guidelines 131 or the investment guidelines 134 responsive thereto.

The process then continues with the step 204 until the account 112 is closed.

Alternative Embodiments

Although preferred embodiments are disclosed herein, many variations are possible which remain within the concept, scope, and spirit of the invention, and these variations would become clear to those skilled in the art after perusal of this application.

We claim:

1. A computer system for managing and tracking an investment and spending account, said system comprising a memory comprising account information, said account information beings associated with an investment account and a spending account;

a process or coupled to said memory, said processor being disposed to process said account information and to process at least one transaction associated with either or both said investment account or said spending account;

said memory comprising a set of investment guidelines associated with said investment account and a set of spending flexibility guidelines associated with said spending account, said investment guidelines and said spending flexibility guidelines coordinated to obtain a selected rate of return;

a program for directing said processor to determine, responsive to said account information, a first condition for raising a first signal associated with said investment guidelines, for directing said processor to determine, responsive to said account information a second condition for raising a second signal associated with said spending flexibility guidelines, and for directing said processor to raise said first signal or said second signal, responsive to said account information and said at least one transaction.

2. A computer system as in claim 1, comprising:

means for communicating with an account holder; and means for communicating with an account manager.

3. A computer system as in claim 1, comprising means for directing said processor to indicate suggested adjustments to said account, responsive to said first signal or said second signal.

4. A computer system as in claim 3, wherein said suggested adjustments to said account comprise account statements to an account holder associated with said account.

5. A computer system as in claim 3, wherein said suggested adjustments to said account comprise investment statements to an account manager associated with said account.

6. A computer system as in claim 1, comprising means for monitoring expected inflows and expected outflows associated with said account; and means for altering said account information responsive to said expected inflows and expected outflows, whereby said first signal or said second signal are raised responsive to changes in said expected inflows and expected outflows.

7. A computer system as in claim 1, wherein said means for directing said processor to determine, responsive to said account information, a first condition for raising a first signal associated with said investment guidelines, comprises means for directing said processor to determine an expected investment return, responsive to said investment guidelines;

means for directing said processor to compare said expected investment return with said investment guidelines; and means for directing said processor to define said first condition responsive to a result of a comparison performed by said processor responsive to said means for directing said processor to compare said expected investment return with said investment guidelines.

8. A computer system as in claim 1, wherein said means for directing said processor to determine, responsive to said account information, a second condition for raising a second signal associated with said spending flexibility guidelines, comprises means for directing said processor to determine an expected investment return, responsive to said investment guidelines;

means for directing said processor to compare said expected investment return with said investment guidelines; and means for directing said processor to define said second condition responsive to a result of a comparison performed by said processor responsive to said means for directing said processor to compare said expected investment return with said investment guidelines.

9. A computer system as in claim 1, wherein said set of investment guidelines are selected from a group comprising known cash returns, known maturity dates, known percent returns, and combinations thereof.

10. A computer system as in claim 1, wherein said set of spending flexibility guidelines are selected from the group comprising known cash loan buffers, known interest rates, known payment rates, known percent of account size loan buffers, and combinations and derivatives thereof.

11. A computer system for managing and tracking an investment and spending, account, said system comprising:

a memory, said memory comprising an account database, said account database comprising at least one account, said account having a spending component and an investment component;

a processor coupled to said memory, said processor comprising means for executing an account management program in said memory, said account management program having an account monitor component disposed to generate a spending flexibility signal responsive to said spending component or to generate an investment signal responsive to said investment component;

an input device coupled to said processor; said account management program comprising an information receipt component disposed to receive a transaction from said input device;

said account management program comprising a transaction processing component disposed to update said account responsive to said transaction; and a communication link coupled to said processor;

an account card disposed for coupling to said communication link and comprising means for receiving information about said account from said processor using said communication link.

12. A computer system as in claim 11, further comprising a display coupled to said account card and disposed to display said information.

13. A computer system as in claim 11, wherein said account card comprises a writable card memory; and means for writing said information in said writable card memory.

14. A computer system as in claim 11, wherein said memory comprises a set of investment guidelines associated with said account and a set of spending flexibility guidelines associated with said account.

15. A computer system as in claim 14, comprising means for directing said processor to determine, responsive to said account information, a first condition for raising a first signal associated with said investment guidelines;

means for directing said processor to determine, responsive to said account information, a second condition for raising a second signal associated with said spending flexibility guidelines; and means for directing said processor to raise said first signal or said signal, responsive to said account information and said at least one transaction.

16. A computer system for managing and tracking an investment and spending account, said system comprising a memory, said memory comprising an account database, said account database comprising at least one account, said account comprising a spending component and an investment component;

a processor coupled to said memory, said processor comprising means for executing an account management program in said memory;

an input device coupled to said processor; said account management program comprising an information receipt component disposed to receive a transaction from said input device;

said account management program comprising a transaction processing component disposed to update said account responsive to said transaction; and said account management program comprising an account monitor component disposed to generate a spending flexibility signal responsive to said spending component or to generate an investment signal responsive to said investment component, said spending component comprising a spending balance, a set of spending guidelines, and a set of actions associated with failure to meet said spending guidelines, and said investment component comprising an investment balance, a set of investment guidelines, and a set of actions associated with failure to meet said investment guidelines, said set of spending guidelines and said set of investment guidelines coordinated to obtain a selected rate of return for said account.

17. A computer system as in claim 16, comprising an output device coupled to said processor; wherein said account management program comprises a report component coupled to said output device and disposed to generate a report to an account holder associated with said spending component responsive to said spending flexibility signal.

18. A computer system as in claim 16, comprising an output device coupled to said processor; wherein said account management program comprises a report component coupled to said output device and disposed to generate a report to an account manager associated with said investment component responsive to said investment signal.

19. A computer system as in claim 16, comprising an output device coupled to said processor;

wherein said account management program comprises a report component coupled to said spending component, to said spending flexibility signal, to said investment component, to said investment signal; and wherein said report component is coupled to said output device, and disposed to generate a report to an account holder associated with said spending component, said report directing said account holder to increase said spending balance by an amount sufficient to simultaneously meet said spending flexibility guidelines and said investment guidelines, responsive to said spending balance, to said spending flexibility signal, to said investment balance, and to said investment signal.

20. A computer system as in claim 16, comprising an output device coupled to said processor; wherein a report component is coupled to said output device, and disposed to generate a report to an account holder associated with said spending account, said report describing said spending flexibility guidelines after relaxation.

21. A computer system as in claim 16, wherein said account management program comprises a report component coupled to said spending component, to said spending flexibility signal, to said investment component, to said investment signal; and wherein said report component is disposed to alter said investment guidelines sufficient to simultaneously meet said spending flexibility guidelines and said investment guidelines, responsive to said responsive to said spending balance, to said spending flexibility signal, to said investment balance, and to said investment signal.

22. A computer system as in claim 21, comprising an output device coupled to said processor; wherein said report component is coupled to said output device, and disposed to generate a report to an account manager associated with said investment account, said report describing said investment guidelines after alteration.

23. A computer system as in claim 16, wherein said account management program comprises a report component coupled to said spending component, to said spending flexibility signal, to said investment component, to said investment signal; and wherein said report component is disposed to relax said, spending flexibility guidelines by an amount sufficient to simultaneously meet said spending flexibility guidelines and said investment guidelines, responsive to said spending balance, to said spending flexibility signal, to said investment balance, and to said investment signal.

24. A computer system as in claim 16, wherein said account monitoring component comprises means for altering said spending flexibility guidelines or said investment guidelines responsive to an average, for a selected time period, of one of the following: a payment amount from an account holder associated with said spending component, said spending balance, a spending amount, said investment balance, an return on said investment balance, a variance of returns on said investment balance.

25. A computer system as in claim 16, wherein said account monitoring component comprises means for directing said processor to determine an expected investment return, responsive to said investment guidelines;

means for directing said processor to compare said expected investment return with said investment guidelines; and means for directing said processor to generate said investment signal responsive to a result of a comparison performed by said processor responsive to said means for directing said processor to compare said expected investment return with said investment guidelines.

26. A computer system as in claim 16, wherein said account monitoring component comprises means for monitoring expected inflows and expected outflows associated with said account; and means for altering said spending flexibility guidelines or said investment guidelines responsive to said expected inflows and expected outflows, whereby said spending flexibility signal or said investment signal are generated responsive to changes in said expected inflows and expected outflows.

27. A computer system as in claim 16, wherein said set of investment guidelines are selected from a group comprising known cash returns, known maturity dates, known percent returns, and combinations thereof.

28. A computer system as in claim 16, wherein said set of spending flexibility guidelines are selected from the group comprising known cash loan buffers, known interest rates, known payment rates, known percent of account size loan buffers, and combinations and derivatives thereof.

29. A method of operating a computer system for managing and tracking an investment and spending account, said method comprising the steps of loading account information associated with an account into a memory;

coupling a processor to said memory, and disposing said processor to process said account information and to process at least one transaction associated with said account;

loading a set of investment guidelines associated with said account and a set of spending flexibility guidelines associated with said account into said memory;

directing said processor to determine, responsive to said account information, a first condition for raising a first signal associated with said investment guidelines, said directing said processor to determine step comprises the steps of:

directing said processor to determine an expected investment return, responsive to said investment guidelines;

directing said processor to compare said expected investment return with said investment guidelines; and directing said processor to define said first condition responsive to a result of a comparison performed by said processor responsive to said means for directing said processor to compare said expected investment return with said investment guidelines;

directing said processor to determine, responsive to said account information, a second condition for raising a second signal associated with said spending flexibility guidelines, said directing said processor to determine step comprises the steps of:

directing said processor to determine an expected investment return, responsive to said investment guidelines;

directing said processor to compare said expected investment return with said investment guidelines; and directing said processor to define said second condition responsive to a result of a comparison performed by said processor responsive to said means for directing said processor to compare said expected investment return with said investment guidelines; and directing said processor to raise said first signal or said signal, responsive to said account information and said at least one transaction.

30. A method as in claim 29, further comprising the step of directing said processor to indicate suggested adjustments to said account, responsive to said first signal or said second signal.

31. A method as in claim 30, wherein said suggested adjustments to said account comprise account statements to an account holder associated with said account.

32. A method as in claim 30, wherein said suggested adjustments to said account comprise investment statements to an account manager associated with said account.

33. A method as in claim 29, further comprising the steps of communicating with an account holder; and communicating with an account manager.

34. A method as in claim 29, further comprising the steps of monitoring expected inflows and expected outflows associated with said account; and altering said account information responsive to said expected inflows and expected outflows, whereby said first signal or said second signal are raised responsive to changes in said expected inflows and expected outflows.

35. A method as in claim 29, further comprising the step of selecting said set of investment guidelines from a group comprising known cash returns, known maturity dates, known percent returns, and combinations thereof.

36. A method as in claim 29, further comprising the step of selecting said set of spending flexibility guidelines from the group comprising known cash loan buffers, known interest rates, known payment rates, known percent of account size loan buffers, and combinations and derivatives thereof.

37. A method of operating a computer system for managing and tracking an investment and spending account, said method comprising the steps of:

loading an account database, said account database comprising at least one account, into a memory;

loading a set of investment guidelines associated with said account and a set of spending flexibility guidelines associated with said account into said memory;

coupling a processor to said memory;

directing said processor to execute an account management program in said memory;

directing said processor to receive a transaction; directing said processor to update said account responsive to said transaction; and coupling a communication link to said processor; coupling an account card to said communication link; receiving information using said account card about said account from said processor using said communication link.

38. A method as in claim 37, further comprising the step of displaying said information.

39. A method as in claim 37, further comprising the steps of:

directing said processor to determine, responsive to said account information, a first condition for raising a first signal associated with said investment guidelines;

directing said processor to determine, responsive to said account information, a second condition for raising a second signal associated with said spending flexibility guidelines; and directing said processor to raise said first signal or said signal, responsive to said account information and said at least one transaction.

40. A method as in claim 37, wherein said account comprises a spending component and an investment component; and comprising the step of directing said processor to generate a spending flexibility signal responsive to said spending component or to generate an investment signal responsive to said investment component.

41. A method as in claim 37, wherein said step of receiving information using said account card comprises the step of writing said information in a writable card memory for said account card.

42. A method for operating a computer system for managing and tracking an investment and spending account, said method comprising the steps of:

loading an account database into a memory, said account database comprising at least one account, said account comprising a spending component and an investment component, said spending component having a spending balance and a set of spending guidelines, and said investment component having an investment balance and a set of investment guidelines;

coupling a processor to said memory, and directing said processor to execute an account management program in said memory;

coupling an input device to said processor;

directing said processor to receive a transaction from said input device;

directing said processor to update said account responsive to said transaction;

directing said processor to generate a spending flexibility signal responsive to said spending component or to generate an investment signal responsive to said investment component; and directing said processor to alter said spending flexibility guidelines or said investment guidelines responsive to an average for a selected time period of one of the following: a payment amount from an account holder associated with said spending component, said spending balance, a spending amount, said investment balance, a return on said investment balance, or a variance of returns on said investment balance.

43. A method as in claim 42, further comprising the step of directing said processor to alter said investment guidelines sufficient to simultaneously meet said spending flexibility guidelines and said investment guidelines, responsive to said spending balance, to said spending flexibility signal, to said investment balance, and to said investment signal.

44. A method as in claim 43, further comprising the step of directing said processor to generate a report to an account manager associated with said investment account, said report describing said investment guidelines after alteration.

45. A method as in claim 42, wherein said spending component further comprises:

a set of actions associated with failure to meet said spending guidelines; and said investment component further comprises a set of actions associated with failure to meet said investment guidelines.

46. A method as in claim 45, further comprising the steps of:

directing said processor to determine an expected investment return, responsive to said investment guidelines;

directing said processor to compare said expected investment return with said investment guidelines; and directing said processor to generate said investment signal responsive to a result of a comparison performed by said processor responsive to said means for directing said processor to compare said expected investment return with said investment guidelines.

47. A method as in claim 45, further comprising the step of directing said processor to generate a report to an account holder associated with said spending component responsive to said spending flexibility signal.

48. A method in claim 45, further comprising the step of directing said processor to generate a report to an account holder associated with said spending component, said report directing said account holder to increase said spending balance by an amount sufficient to simultaneously meet said spending flexibility guidelines and said investment guidelines, responsive to said spending balance, to said spending flexibility signal, to said investment balance, and to said investment signal.

49. A method as in claim 45 further comprising the step of directing said processor to generate a report to an account manger associated with said investment component responsive to said investment single.

50. A method as in claim 45 further comprising the step of directing said processor to relax said spending flexibility guidelines by an amount sufficient to simultaneously meet said spending flexibility guidelines and said investment guidelines, responsive to said spending balance, to said spending flexibility signal, to said investment balance, and to said investment signal.

51. A method as in claim 45 further comprising the comprising the step of directing said processor to generate a report to an account holder associated with said spending account, said report describing said spending flexibility guidelines after relaxation.

52. A method as in claim 45 further comprising the steps of directing said processor to monitor expected inflows and expected outflows, whereby said spending flexibility signal or said investment signal are generated responsive to change in said expected inflows and expected outflows.

53. A method as in claim 45 further comprising the step of selecting said set of investments guidelines from a group comprising known cash returns, known maturity dates, known percent returns, and combination thereof.

54. A method as in claim 50 further comprising the step of selecting said set of spending flexibility guidelines from the group comprising known cash loan buffers, known interest rates, known payment rates, known percent of account size loan buffers, and combinations and derivatives thereof.

55. A computer system for managing and tracking an investment and spending account, said system comprising:

a memory, said memory comprising an account database, a set of investment guidelines, a set of spending flexibility guidelines, said account database comprising at least one account, said at least one account having an investment account that is associated with said investment guidelines and a spending account that is associated with set of spending flexibility guidelines, said investment guidelines and said spending flexibility guidelines coordinated to obtain a selected rate of return;

a processor coupled to say memory, said processor comprising means for executing an account management program in said memory;

an input device coupled to said processor; said account management program comprising an information receipt component disposed to receive a transaction from from said input device;

said account management program comprising a transaction processing component disposed to update said account responsive to said transaction; and a communication link coupled to said processor; a terminal disposed for coupling to said communication link, said terminal coupled to a vending device and disposed to trigger said vending device upon receipt of a signal representative of a financial transaction.

56. A computer system as in claim 55, comprising an account card comprising means for receiving information about said account from said processor using said communication link and said terminal.

57. A computer system as in claim 56, wherein said account card comprises a writable card memory and means for writing said information in said writable card memory.

58. A computer system as in claim 56, comprising a display coupled to said account card and disposed to display said information.

59. A computer system as in claim 56, wherein said account comprises a spending component and an investment component; and wherein said account management program comprises an account monitor component disposed to generate a spending flexibility signal responsive to said spending component or to generate an investment signal responsive to said investment component.

60. A computer system as in claim 56, wherein said memory comprises a set of investment guidelines associated with said account and a set of spending flexibility guidelines associated with said account.

61. A computer system as in claim 60, comprising means for directing said processor to determine, responsive to said account information, a first condition for raising a first signal associated with said investment guidelines;

means for directing said processor to determine, responsive to said account information, a second condition for raising a second signal associated with said spending flexibility guidelines; and means for directing said processor to raise said first signal or said signal, responsive to said account information ant said at least one transaction.

62. A computer system as in claim 55, comprising a display coupled to said terminal and disposed to display said financial transaction.

63. A computer system as in claim 55, wherein said account comprises a spending component and an investment component; and wherein said account management program comprises an account monitor component disposed to generate a spending flexibility signal responsive to said spending component or to generate an investment signal responsive to said investment component.

64. A computer system as in claim 55, wherein said memory comprises a set of investment guidelines associated with said account and a set of spending flexibility guidelines associated with said account.

65. A computer system as in claim 64, comprising:

means for directing said processor to determine, responsive to said account information, a first condition for raising a first signal associated with said investment guidelines;

means for directing said processor to determine, responsive to said account information, a second condition for raising a second signal associated with said spending flexibility guidelines; and means for directing said processor to raise said first signal or said signal, responsive to said account information and said at least one transaction.

66. A method of operating a computer system for managing and tracking an investment and spending account, said method comprising the steps of:

loading an account database, said account database comprising at least one account, into a memory said at least one account having an investment account and a spending account, said memory comprising a set of investment guidelines associated with said investment account and a set of spending flexibility guidelines associated with said spending account, said investment guidelines and said spending flexibility guidelines coordinated to obtain a selected rate of return;

coupling a processor to said memory;

coupling an input device to said processor;

receiving a transaction from said input device;

updating said account responsive to said transaction;

coupling a communication link to said processor; and coupling a terminal to said communication link and to a vending device, receiving a signal representative of a financial transaction at said terminal, and triggering said vending device upon receipt of said signal.

67. A method as in claim 66, further comprising the step of receiving information about said account from said processor using said communication link and said terminal at an account card.

68. A method as in claim 67, further comprising the step of writing said information in a writable card memory at said account card.

69. A method as in claim 67, further comprising a display coupled to said account card and disposed to display said information.

70. A method as in claim 67, wherein said account comprises a spending component and an investment component; and wherein said account management program comprises an account monitor component disposed to generate a spending flexibility signal responsive to said spending component or to generate an investment signal responsive to said investment component.

71. A method as in claim 67, wherein said memory comprises a set of investment guidelines associated with said account and a set of spending flexibility guidelines associated with said account.

72. A method as in claim 67, further comprising means for directing said processor to determine, responsive to said account information, a first condition for raising a first signal associated with said investment guidelines;

means for directing said processor to determine, responsive to said account information, a second condition for raising a second signal associated with said spending flexibility guidelines; and means for directing said processor to raise said first signal or said signal, responsive to said account information and said at least one transaction.

73. A method as in claim 72, further comprising a display coupled to said terminal and disposed to display said financial transaction.

74. A method as in claim 72, wherein said account comprises a spending component and an investment component; and wherein said account management program comprises an account monitor component disposed to generate a spending flexibility signal responsive to said spending component or to generate an investment signal responsive to said investment component.

75. A method as in claim 72, wherein said memory comprises a set of investment guidelines associated with said account and a set of spending flexibility guidelines associated with said account.

76. A method as in claim 75, comprising means for directing said processor to determine, responsive to said account information, a first condition for raising a first signal associated with said investment guidelines;

means for directing said processor to determine, responsive to said account information, a second condition for raising a second signal associated with said spending flexibility guidelines; and means for directing said processor to raise said first signal or said signal, responsive to said account information and said at least one transaction.

* * * * *